Feb. 5, 1929.                                     1,701,133
J. A. ULMER
IGNITING DEVICE FOR SMUDGE POTS
Filed Nov. 15, 1927            2 Sheets-Sheet 1
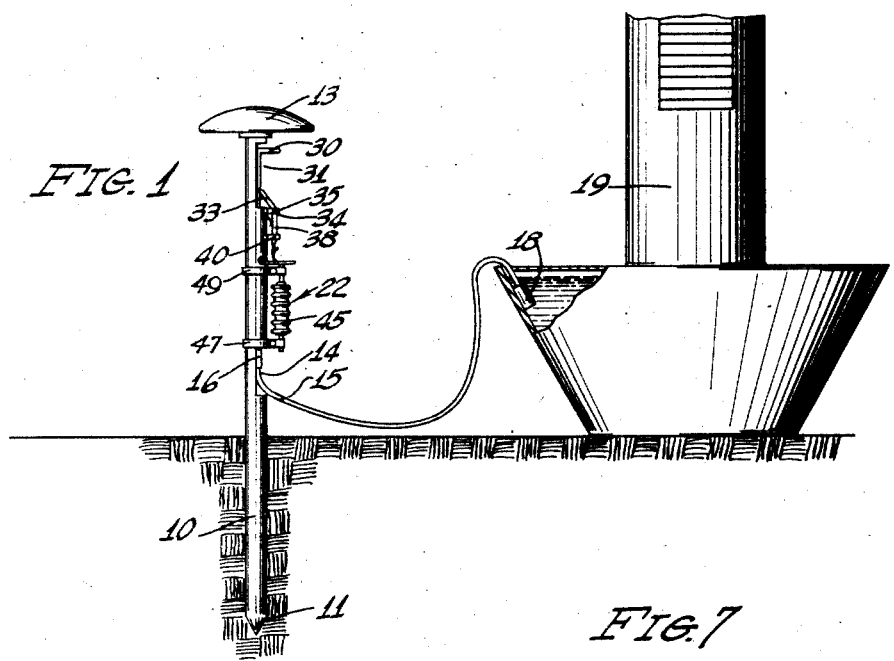
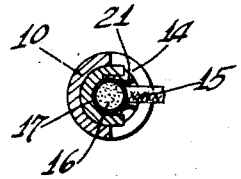
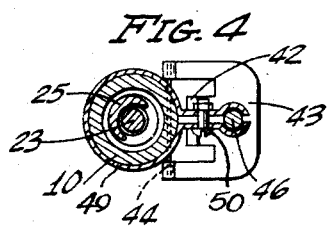
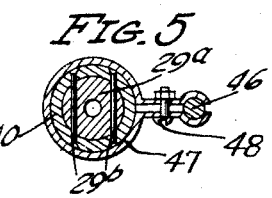
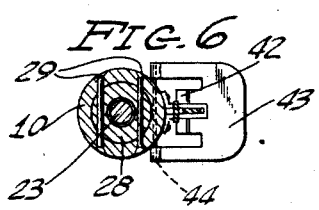
INVENTOR
JOSEPH A. ULMER
Munn & Co.
ATTORNEYS Feb. 5, 1929.
J. A. ULMER
1,701,133
IGNITING DEVICE FOR SMUDGE POTS
Filed Nov. 15, 1927    2 Sheets-Sheet 2
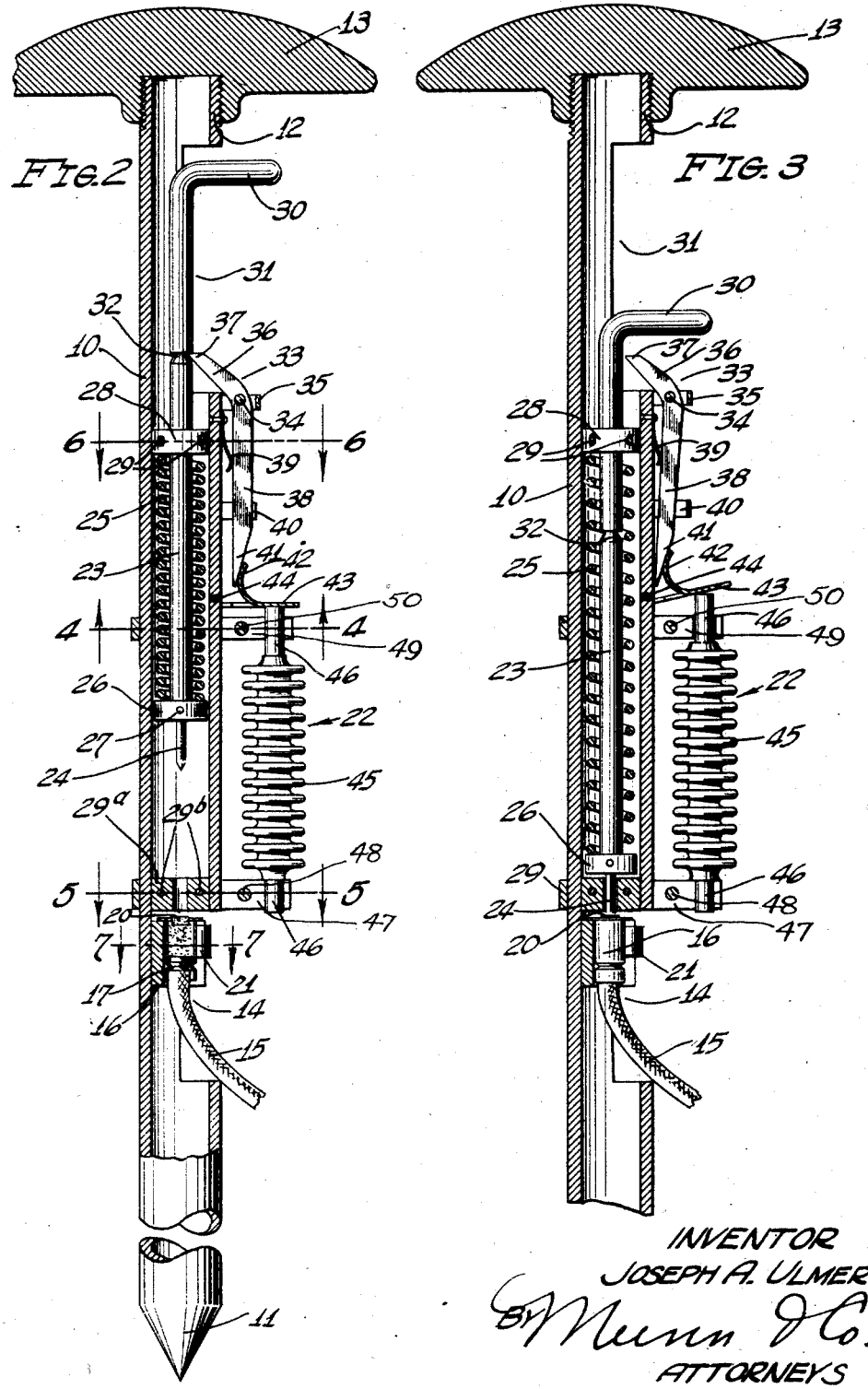
INVENTOR
JOSEPH A. ULMER
BY Munn & Co.
ATTORNEYS Patented Feb. 5, 1929.

1,701,133

UNITED STATES PATENT OFFICE.

JOSEPH A. ULMER, OF LOS ANGELES, CALIFORNIA.

IGNITING DEVICE FOR SMUDGE POTS.

Application filed November 15, 1927. Serial No. 233,487.

My invention relates to igniting device for smudge pots, of the general character embodied in my U. S. Patent No. 1,676,368, issued July 10, 1928, which involves a device normally inactive but which upon the atmospheric temperature surrounding a smudge pot, dropping to a predetermined degree such as would be injurious to the fruit in a citrus grove, becomes active to ignite the smudge pot and thus raise the temperature of the atmosphere sufficiently to prevent injury to the fruit.

It is a purpose of my present invention to provide an igniting device of the above described character embodying simple and substantial temperature controlled mechanism which is extremely sensitive and is rendered active in response to the relatively limited movement of a thermo-responsive means at low temperatures, thus positively insuring that the smudge pot will be ignited when a predetermined low temperature injurious to the fruit, is reached.

I will describe only one form of igniting device for smudge pots embodying my invention and will then point out the novel features in claims.

In the accompanying drawing,

Figure 1 is a view showing in side elevation one form of igniting device embodying my invention, applied to a smudge pot;

Figures 2 and 3 are enlarged views showing in vertical section the igniting device shown in Figure 1 and illustrating the inactive and active positions respectively, thereof; and Figures 4, 5, 6, and 7 are horizontal sectional views taken on the lines 4—4, 5—5, 6—6, and 7—7, respectively, of Figure 2 and looking in the direction of the arrows.

Referring specifically to the drawing in which similar reference characters designate similar parts in each of the several views, my invention in its present embodiment comprises a tubular stake 10 having a closed and pointed lower end as indicated at 11 and an open and exteriorly threaded upper end 12 threadedly receiving a head 13 adapted to be struck by a hammering instrument (not shown) to facilitate driving the stake into the ground. The stake is provided with an opening 14 to permit the insertion of a fuse 15 into the stake, and the inserted end of the fuse is provided with a conventional form of blank cartridge 16 to which the fuse is secured by crimping the shell 17 of the cartridge as clearly shown in Fig. 2. The other end of the fuse is provided with a pellet 18 formed of an ignitable substance and the fuse leads to a conventional smudge pot 19, with the pellet 18 submerged in the body of oil of the smudge pot.

The cartridge 16 is fixedly supported in the stake 10 with its primer 20 uppermost, by means of a spring clip 21 secured to the wall of the stake, and the cartridge is adapted to be fired to ignite the fuse, and through the medium of the latter, the oil in the smudge pot, by means of the following mechanism controlled by a temperature responsive means in the form of a thermostatic element 22.

The mechanism in the present instance comprises a plunger 23 reduced at one end to provide a firing pin 24 and mounted in the stake 10 for movement from the set or inactive position shown in Fig. 2 to a tripped or active position shown in Fig. 3, wherein the firing pin strikes the primer 20 of the cartridge 16 to fire the latter, the plunger being normally urged to its tripped position by means of a coil spring 25 surrounding the plunger and interposed between a collar 26 secured to the plunger by a pin 27 and a collar 28 fixed to the stake by rivets 29 and having a central opening through which the plunger extends. The tripped position of the plunger is limited by means of an abutment 29$^a$ secured to the stake by rivets 29$^b$, and having an opening through which the firing pin extends to strike the cartridge.

The upper end of the plunger 23 is provided with a lateral extension 30 projecting through a slot 31 formed in the stake and adapted to be grasped by an operator to move the plunger to its set position against the action of the spring 25; and to latch the plunger in its set position it is annularly grooved to provide a notch 32 with which a latching member 33 is adapted to have latching engagement. In the present instance the latching member is pivoted between its ends on a pin 34 journaled in a bracket 35 secured to the stake, the member providing a relatively short and angularly disposed arm 36 having its free end pointed as indicated at 37 for latching engagement with the notch 32, and a relatively long arm 38 engaged by a flat spring 39 so as to normally urge the member into latching engagement with the plunger and against a stop 40 fixed to the stake. The free end of the arm 38 is tapered as indicated at 41 to provide a cam surface engaged by a curved, laterally extending tongue 42 formed on an actuator 43 pivoted on a pin 44 journaled in the wall of the stake.

The thermostatic element 22 in the present instance comprises an elongated hollow body 45 of relatively thin metal which is pleated as shown so as to be rendered flexible and expansible longitudinally, and to the ends of the body heads 46 are fixed, the lower head being clamped in a split bracket 47 and the bracket in turn to the stake, by means of a screw 48, while the upper head is slidable in a split bracket 49 clamped to the stake by means of a screw 50. The actuator 43 normally rests upon the upper head 46, and it will be clear that with the body 45 filled with a fluid such as for instance water or a suitable gas which increases in volume in response to a decrease in temperature, the body, as a result of such increase in volume will be proportionately expanded or increased in length to swing the actuator 43 upwardly about the pin 44.

In practice, the thermostatic element is designed so that when the atmosphere in the vicinity of the smudge pot approaches a predetermined low temperature which would be injurious to citrus fruits, the body 45 will be expanded sufficiently to move the actuator from the position shown in Fig. 2 to that shown in Fig. 3, so that with the plunger 23 occupying its set position and latched by the latching member 33 as shown in Fig. 2, the latching member, through the medium of the cam surface 41 and tongue 42, will be moved to the position shown in Fig. 3, thus releasing the plunger to permit its firing pin 24 to strike the primer of the cartridge 16 and fire the latter. The oil in the smudge pot 19 will as a consequence be ignited by the fuse 15 to raise the temperature of the surrounding atmosphere in time to prevent injury to the fruit.

The mechanism of my device is operative to fire the cartridge with a minimum amount of expansion of the thermostatic element and with but a relatively light pressure against the actuator 43 so as to positively insure that the ignition of the oil in the smudge pot will not be delayed until too late to prevent injury to the fruit. The mechanism while being extremely sensitive, will normally be maintained inactive against accidental operation, and is positively rendered active in response to the relatively limited movement of a thermostat at low temperatures such as would cause injury to citrus fruits.

It will be clear that the device can be used indefinitely as it is only necessary to restore the plunger 23 to its set position, and remove the fired cartridge from the clip 21, replacing the fired cartridge with a loaded cartridge and a new fuse.

Although I have herein shown and described only one form of igniting device for smudge pots embodying my invention, it is to be understood that various changes and modifications may be made therein without departing from the spirit of the invention and the spirit and scope of the appended claims.

I claim as my invention:

1. A device of the character described comprising means including a firing pin mounted for movement and normally urged to a tripped position wherein the firing pin is adapted to strike a cartridge for igniting a fuse leading to a smudge pot, said means movable to a set position, a pivoted latching member normally urged to one position to latch the first means in its set position and movable to a second position to release the first means, a pivoted actuator for the latching member normally occupying one position and movable to a second position to engage and move the latching member to its second mentioned position, and temperature responsive means operable at a predetermined degree of temperature to engage and move the actuator to its second mentioned position, whereby the latching member will be moved to release the first means and thereby permit the latter to move to its urged position and effect striking of the cartridge by the firing pin.

2. A device as embodied in claim 1 wherein said latching member and actuator are provided with means co-acting in response to a relatively slight pressure by the temperature responsive means against the actuator to effect movement of the member to its second mentioned position.

3. A device of the character described comprising a reciprocating plunger having a firing pin thereon, and normally urged to a tripped position wherein the firing pin is adapted to strike a cartridge for igniting a fuse leading to a smudge pot, said plunger movable to a set position, a latching member pivoted between its ends to provide a relatively short arm and a relatively long arm, said latching member normally urged to one position for latching engagement of its short arm with the plunger to latch the latter in its set position, and movable to a second position to release the plunger, a pivoted actuator responsive to a relatively light pressure to move the latching member to its second mentioned position, and temperature responsive means operable at a predetermined degree of temperature to actuate the last means and thereby effect movement of the latching member to its second mentioned position, whereby the plunger will be free to move to its urged position and thereby effect striking of the cartridge by the firing pin.

4. A device of the character described comprising a tubular stake adapted to be driven into the ground and having an opening through which a fuse is adapted to be inserted into the stake, means in the stake for fixedly supporting a cartridge adapted to ignite the fuse, a plunger mounted in the stake and having a firing pin adapted to strike the cartridge, means for normally urging the plunger to one extreme position to effect striking of the cartridge by the firing pin, means for latching the plunger in another extreme position, and temperature responsive means operable at a predetermined degree of temperature to release the latching means and thereby permit the plunger to move to its first extreme position and effect striking of the cartridge by the firing pin.

5. A device of the character embodied in claim 4 wherein the stake is provided with a second opening, and the plunger is provided with an extension projecting through said opening and adapted to be grasped by an operator to move the plunger to its second mentioned position against the action of said urging means.

6. A device of the character described comprising a tubular stake adapted to be driven into the ground and having an opening through which a fuse is adapted to be inserted into the stake, means in the stake for fixedly supporting a cartridge adapted to ignite the fuse, a plunger mounted in the stake and having a firing pin adapted to strike the cartridge, means for normally urging the plunger to one extreme position to effect striking of the cartridge by the firing pin, means for latching the plunger in another extreme position, means responsive to a relatively light pressure to actuate the latching means and release the plunger, temperature responsive means operable at a predetermined degree of temperature to actuate the last means and thereby effect a release of the latching means from the plunger, whereby the latter will be free to move to its urged position and effect striking of the cartridge by the firing pin, said means responsive to a relatively light pressure comprising an actuator pivotally mounted on the stake, and coacting cam means on the latching means and actuator operable in response to movement of the actuator by the temperature responsive means to actuate the latching means and release the plunger.

7. A device of the character described comprising a tubular stake adapted to be driven into the ground and having an opening through which a fuse is adapted to be inserted into the stake, means in the stake for fixedly supporting a cartridge adapted to ignite the fuse, a plunger reciprocable in the stake and having a firing pin at one end, said plunger having a collar fixed thereto, a second collar fixed against movement in the stake and having an opening through which the plunger extends, a coil spring surrounding the plunger and interposed between said collars so as to urge the plunger to one extreme position for striking of the cartridge by the firing pin, said plunger having a notch, a latching member pivoted between its ends on the stake to provide a relatively short arm and a relatively long arm, a spring for urging the latching member to one position for latching engagement of said short arm with said notch so as to maintain the plunger in another extreme position against the action of said coil spring, an actuator for the latching member pivoted on the stake, temperature responsive means mounted on the stake and engaging the actuator, for actuating the latter at a predetermined degree of temperature, and means on the long arm of the latching member and on the actuator operable in response to relatively light pressure against the actuator by the temperature responsive means to move the latching member to a second position and effect a release of the plunger.

8. A device of the character embodied in claim 7 wherein said last means comprises a cam surface on the long arm of the latching member, and a laterally projecting tongue on the actuator having sliding engagement with the cam surface.

9. A device of the character embodied in claim 7 wherein the temperature responsive means comprises a hollow element of elongated form, capable of expansion longitudinally and having a fluid therein adapted to increase in volume in response to a decrease in temperature, to thereby expand the element, said element having heads at its ends, one of which is fixedly supported on the stake, and the other of which is slidably associated with the stake and engages the actuator.

10. A device of the character described comprising a firing pin mounted for movement to occupy a set position and normally tending to move to a tripped position wherein it is adapted to strike a cartridge for igniting a fuse leading to a smudge pot, a pivoted latching member for latching the firing pin in its set position, a pivoted actuator correlated with the latching member to move the latter to a position wherein it will release the firing pin, and means operable at a predetermined degree of temperature to move the actuator sufficiently to cause the latching member to release the firing pin, whereby the firing pin will be free to move to its tripped position and strike the cartridge.

11. A device as embodied in claim 10 including means operable in response to a relatively slight pressure by the temperature responsive means against the actuator to effect movement of the latching member to releasing position.

12. A device as embodied in claim 10 including co-acting cam means on the latching member and actuator operable in response to a relatively slight pressure by the temperature responsive means against the actuator, to effect movement of the latching member to releasing position.

13. A device of the character described comprising a stake adapted to be driven into the ground, means for supporting a fuse igniting cartridge in the stake, means mounted for movement in the stake to occupy a set position and normally urged to a tripped position wherein it is adapted to strike and ignite the cartridge, means for latching the second means in its set position, means operable at a predetermined temperature to release the second means for movement to its tripped position, and means accessible from exteriorly of the stake by which the second means can be manually moved to its set position.

JOSEPH A. ULMER.